United States Patent [19]
Arnold et al.

[11] Patent Number: 5,575,846
[45] Date of Patent: Nov. 19, 1996

[54] MORTAR COMPOSITION INCLUDING A MINERAL MORTAR PASTE

[75] Inventors: Norbert Arnold, Waldachtal; Willi Haug, Freudenstadt-Musbach, both of Germany

[73] Assignee: fischerwere, Artur Fischer GmbH & Co KG, Waldachtal, Germany

[21] Appl. No.: 528,955

[22] Filed: Sep. 15, 1995

[30] Foreign Application Priority Data

Sep. 15, 1994 [DE] Germany .................... 44 32 879.6

[51] Int. Cl.$^6$ .................................... C04B 24/00
[52] U.S. Cl. .................. 106/802; 106/807; 106/819; 106/823; 405/259.6; 405/266; 166/293
[58] Field of Search .................... 106/287.16, 724, 106/802, 807, 737, 819, 823, 287.13, 287.15, 285; 405/259.1, 259.5, 259.6, 266; 524/2, 650, 3, 4; 166/293

[56] References Cited

U.S. PATENT DOCUMENTS

| | | | |
|---|---|---|---|
| 2,937,950 | 5/1960 | Tillmann | 106/38.24 |
| 4,126,003 | 11/1978 | Tomic | 106/807 |
| 4,126,005 | 11/1978 | Coursen | 106/807 |
| 4,126,009 | 11/1978 | Tomic | 106/802 |
| 4,127,001 | 11/1978 | Tomic | 106/802 |
| 4,174,227 | 11/1979 | Tomic | 106/690 |

FOREIGN PATENT DOCUMENTS

| | | |
|---|---|---|
| 54697 | 8/1912 | Austria . |
| 0502348 | 9/1992 | European Pat. Off. . |
| 289799 | 2/1913 | Germany . |
| 1282533 | 7/1961 | Germany . |
| 3300410 | 7/1983 | Germany . |
| 3300409 | 7/1983 | Germany . |
| 3430368 | 3/1985 | Germany . |
| 4100386 | 7/1992 | Germany . |
| 4106311 | 10/1992 | Germany . |
| 4238177 | 5/1994 | Germany . |
| 127975 | 10/1928 | Switzerland . |

*Primary Examiner*—Mark L. Bell
*Assistant Examiner*—Michael Marcheschi
*Attorney, Agent, or Firm*—Michael J. Striker

[57] ABSTRACT

The mortar composition for fixing an anchoring element in a drilled hole in a substrate consists of a water component and a mineral mortar paste held separately from the water component in a crushable container. The mineral mortar paste includes a mixture of mineral mortar and a liquid solvent chemically inert towards the mineral mortar and the mineral mortar paste is hardenable with the water component to form a hardened mortar compound. The water component consists of water and a thixotropic agent so that the water component acts like a paste when not subject to shear forces but flows when subject to shear forces such as those created by the anchoring element advancing in the drilled hole. The thixotropic agent is advantageously amorphous pyrogenic silicic acid.

7 Claims, No Drawings

MORTAR COMPOSITION INCLUDING A MINERAL MORTAR PASTE

BACKGROUND OF THE INVENTION

The invention relates to a two-component mortar composition, consisting of a water component and mineral mortar held separately from the water component in a capsule or cartridge, for fixing anchoring elements in a drilled hole in a substrate and, more generally, to hardenable mortar compositions.

A capsule described in European Patent Application EP-A 502 348 for a composite anchor contains a mineral mortar component and a separately held water component. The mortar, on account of its low density and consequently high volume proportion, is located in the larger outer chamber, while the water component is located in the smaller inner chamber.

Cartridges which contain either just the mineral mortar or, in a two-chamber cartridge, both components of the hardened mortar compound held separately from one another prior to use are also known for working up or hardening mortar to form hardened mortar compounds. Mixing of the two components is effected either in the cartridge, by adding water, or in the case of the two-chamber cartridge, by forcing or extruding the two components through a mixing nozzle.

The low bulk density of the mineral mortar necessitates a large-volume container which is considerably larger than the filling volume after the two components have been mixed. Because of the unequal volume ratios between the two components and the great affinity between mortar and water, lumps form as the two components are being mixed and forced from a cartridge, and these lumps tend to create blockages in the mixing nozzle. If the two components are introduced by a capsule into the drilled hole to be filled, driving in of the composite anchor can similarly be hampered, or completely blocked, by formation of lumps in the drilled hole.

SUMMARY OF THE INVENTION

It is an object of the present invention to increase the bulk density of the mortar component held in a mortar-containing cartridge, capsule or other container holding separately a water component and a mineral mortar component which can be mixed to form a hardened mortar compound, and it is also an object of the invention to avoid formation of lumps during use as the two components are mixed to form the hardened mortar compound.

It is another object of the present invention to provide an improved mortar composition for fixing anchoring elements comprising a mineral mortar paste having a bulk density at least three times that of the currently used mineral mortar.

According to the invention, the hardenable mortar composition for fixing anchoring elements in an anchoring substrate consists of a water component and a mineral mortar paste held separately from the water in a crushable container such as a cartridge or crushable capsule. The mineral mortar paste is a mixture of mortar and a liquid solvent, advantageously a water-insoluble non-polar solvent, chemically inert towards the mortar (which, e.g., excludes water itself which reacts with the mortar to form the hardened mortar compound).

By making a paste of the mineral mortar with a liquid solvent that is chemically inert towards the mortar, the bulk density is increased 3 to 4 times. A much larger amount of mortar can be contained in the presently used cartridge or capsule volume, which reduces the package parts and at the same time also the effort involved in assembly. Furthermore, by matching the density of the two components and as a consequence of the more favorable flow behavior of the mineral mortar paste, formation of lumps is avoided. The mortar compound according to the invention is therefore especially suitable for the injection method using a cartridge and attached mixing nozzle.

Water-insoluble, non-polar solvents have proved especially advantageous for making the mineral mortar into a paste. Because of the difference between polar mortar and non-polar solvent, as the mortar paste is mixed with the water component the solvent is spontaneously expelled from the mortar compound. The hardening process of the mortar compound therefore proceeds unaffected by the solvent, so that there is no loss of strength once the hardening process is complete. Water-insoluble, non-polar solvents are customarily saturated hydrocarbons, for example, alkanes such as hexane or heptane, ethers, chlorinated hydrocarbons, such as dichloromethane, fluorinated hydrocarbons, fluoro-chlorohydrocarbons and volatile silicones.

In a preferred embodiment the proportion of liquid solvent in the mortar paste is from 5 to 50 percent by weight, preferably from 15 to 30 percent by weight.

The water component in one embodiment can consist of water.

However to make the mixing process even more advantageous, both in the cartridge and also when using a two-chamber capsule, a thixotropic agent can be included in the water component so that the water component behaves like a paste when not subjected to shear forces. In particular in the case of a capsule, this solution prevents the water component from draining away when the capsule has been destroyed by the composite anchor. Only as the two components are mixed by means of the composite anchor and are subjected to the shear forces arising therefrom does the viscosity of the water component increase as the composite anchor advances in the drilled hole.

A suitable thixotropic agent is, for example, amorphous, pyrogenic silicic acid, which is admixed in the water component in an amount of 0.5% to 10%.

The thixotropic agent can also be replaced by a suitable thickening agent, (e.g. modified cellulose, acrylic acid polymers, polyvinyl alcohol or similar water-soluble polymers). The mixing process is less advantageous than when using thixotropic agents, however.

A crushable mortar-containing cartridge according to the invention for fixing anchoring elements in drilled holes advantageously may contain only one component, namely the mineral mortar paste described above which is a mixture of mineral mortar and a liquid solvent chemically inert towards the mineral mortar and the liquid solvent is selected so that the mineral mortar paste has a bulk density three to four times that of the mineral mortar prior to mixing with the liquid solvent.

DESCRIPTION OF PREFERRED EMBODIMENTS

The invention will now be illustrated in further detail in the following examples, the details of which are not intended to abridge the scope of the appended claims.

EXAMPLES

Example 1

In this example the mortar composition according to the invention is contained in a capsule for threaded rod M 12 which is suitable for insertion in a drill hole having a drilled hole diameter=14 mm and at an anchoring depth 110 mm. This capsule is divided into an inner capsule contained inside of an outer capsule. The outer and inner capsules have the following dimensions and contents. The walls of both capsules are made of glass.

Outer capsule diameter:
12.6 mm
length: 100 mm
glass wall thickness: ~0.45 mm
Contents:
Mortar: 5 g
Solvent: 2 g heptane
Inner capsule:
Diameter: 7 mm
Glass thickness: ~0.4 mm
Length: ~90 mm
Contents:
Water: 2 g modified (comprising 100 g water +7 g of pyrogenic silicic acid)

Example 2:

In this example the mortar composition according to the invention is contained in a two-chamber cartridge having a mixing nozzle. The total volume of this cartridge is 410 ml and it is divided into two chambers, chamber A and chamber B having a volume ratio of 3.1:1 (volume of chamber A to volume of chamber B). The contents of chambers A and B are as follows.

Chamber A:
500 g mortar
150 g silicone oil (octamethyl cyclotetrasiloxane)
Chamber B:
100 g water While the invention has been illustrated and embodied in a mortar composition for fixing an anchoring in a drilled hole, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. A mortar composition for fixing an anchoring element in a drilled hole, said mortar composition consisting of a water component and a mineral mortar paste held separately from the water component in a crushable container, wherein said mineral mortar paste comprises a mixture of mineral mortar and a liquid solvent chemically inert towards the mineral mortar and said mineral mortar paste is hardenable with said water to form a hardened mortar compound and wherein said water component includes water and a thixotropic agent consisting of amorphous pyrogenic silicic acid so that said water component acts like a paste when not subject to shear forces.

2. The mortar composition as defined in claim 1, wherein said liquid solvent is a water-insoluble non-polar solvent.

3. The mortar composition as defined in claim 2, wherein said water-insoluble non-polar solvent comprises saturated hydrocarbons, ethers, chlorinated hydrocarbons, fluorinated hydrocarbons, fluorinated chlorinated hydrocarbons or silicones.

4. The mortar composition as defined in claim 1, wherein said mineral mortar paste comprises from 5 to 50 percent by weight of liquid solvent.

5. The mortar composition as defined in claims 1, wherein said mineral mortar paste comprises from 15 to 30 percent by weight of liquid solvent.

6. The mortar composition as defined in claim 1, wherein said mineral mortar has a bulk density prior to mixing with said liquid solvent and said liquid solvent is selected so that said mineral mortar paste has a bulk density of three to four times said bulk density of said mineral mortar.

7. The mortar composition as defined in claim 1, wherein said water component contains from 0.5% to 10% of said thixotropic agent.

* * * * *